(12) United States Patent
Rector et al.

(10) Patent No.: US 7,865,962 B2
(45) Date of Patent: Jan. 4, 2011

(54) MULTI-LEVEL SEQUENCE NUMBER BASED LAZY INVALIDATION

(75) Inventors: John Austin Rector, Redmond, WA (US); Eric Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 11/204,978

(22) Filed: Aug. 15, 2005

(65) Prior Publication Data

US 2007/0039056 A1 Feb. 15, 2007

(51) Int. Cl.
*H04N 7/16* (2006.01)
(52) U.S. Cl. .............................. 726/26; 726/18; 726/19; 726/20; 726/21
(58) Field of Classification Search .................. 715/835, 715/861; 380/100, 243, 244, 206; 713/168, 713/500, 166; 709/30, 234, 225, 226; 726/26, 726/12, 2; 711/114, 206, 170, 150, 147, 711/213; 714/52
See application file for complete search history.

(56) References Cited

U.S. PATENT DOCUMENTS

| | | | | |
|---|---|---|---|---|
| 5,341,483 A | * | 8/1994 | Frank et al. | 711/206 |
| 6,606,629 B1 | * | 8/2003 | DeKoning et al. | 707/100 |
| 6,651,142 B1 | * | 11/2003 | Gorelik et al. | 711/119 |
| 6,732,124 B1 | * | 5/2004 | Koseki et al. | 707/202 |
| 2004/0111628 A1 | * | 6/2004 | Inotani et al. | 713/189 |
| 2004/0181645 A1 | * | 9/2004 | Wright et al. | 711/210 |
| 2005/0143660 A1 | * | 6/2005 | Rabiner et al. | 600/467 |
| 2008/0229415 A1 | * | 9/2008 | Kapoor et al. | 726/22 |

\* cited by examiner

*Primary Examiner*—Joseph G Ustaris
*Assistant Examiner*—Nega Woldemariam
(74) *Attorney, Agent, or Firm*—Wolf, Greenfield & Sacks, P.C.

(57) ABSTRACT

A multi-level sequence number is associated with a data provider supplying data for an object. The multi-level sequence number includes a portion that is unique to the data provider, and one or more portions that are shared by other data providers for the object. A per-object table is used to cache data supplied by each data provider for the object and the corresponding multi-level sequence number. A global table associates each data provider with the current value of its multi-level sequence number. Whenever data supplied by a data provider changes, the sequence number in the global table is updated. Cached data of the data provider is updated with current data of the data provider only if the cached value of the sequence number is found to be different from the current value of the sequence number.

10 Claims, 5 Drawing Sheets

Fig.1.

PER-OBJECT TABLE 160

| METADATA PROVIDER 162 | CACHED SEQUENCE NUMBER 164 | CACHED METADATA 166 |
|---|---|---|
| 1 | | |
| 2 | | |
| ⋮ | | |
| N | | |

PROVIDER-SPECIFIC PORTION 202A — COMMON PORTION 204A

Fig.2A.

GLOBAL SEQUENCE NUMBER TABLE 170

| METADATA PROVIDER 172 | CURRENT SEQUENCE NUMBER 174 |
|---|---|
| 1 | |
| 2 | |
| ⋮ | |
| N | |

PROVIDER-SPECIFIC PORTION 202B — COMMON PORTION 204B

MULTI-LEVEL SEQUENCE NUMBER BASED LAZY INVALIDATION

BACKGROUND

Nowadays, a computing system usually includes objects of various forms, such as events, files, I/O completion ports, directories, devices, drivers, stream file objects, etc. Different components in the computing system may try to recognize an object based on attributes associated with the object. A component can be an application program or a unit of an operating system. For example, if the object is a file, a word processing program in the computing system may use the file path to identify the file. The components then may want to understand what data or metadata are associated with the object. For example, the exemplary file may be associated with various metadata such as policies. The policies can include "not allowing the file to run if it is an executable," "running the file in the same directory," "giving the file certain privileges," "allowing the file to run at certain times of the day," or "running the file as a different user," etc. Data such as the policies enable a component to understand what actions the component can perform with the object.

Data such as the exemplary policies mentioned above may be supplied by different sources, i.e., data providers. An object may have many data providers supplying data for the object and the data may change from time to time. Operationally, a computing system may cache the data to improve system performance. A version number, also called a sequence number, may be attached to the data supplied by a specific data provider. Whenever the data supplied by the data provider changes, the sequence number changes, e.g., in increments to indicate a new version of the data. The sequence number may be cached along with the data. The cached sequence number can be used to validate whether the data in the cache is the current version of the data. For example, if the cached sequence number indicates that the cached data is a version 5, and the data provider currently has an updated version, e.g., version 7 of the data, then the cached data is invalid. The computing system can then request the data provider to supply the current version of the data. Such use of the sequence number saves computing time, because the computing system does not have to traverse all objects that have cached the data supplied by the data provider to invalidate the outdated data. Invalidation occurs only when the cached data for the object is requested.

However, the use of sequence numbers may consume too much memory space. For example, the exemplary file object may have thirty data providers supplying data for the file object. The thirty cached sequence numbers consume a specific amount of cache space. A computing system may contain thousands of such objects. Their cached sequence numbers may thus use a large amount of cache space that can otherwise be used to cache more data. Therefore, it is desirable to reduce the size of a sequence number so as to reduce the cache space the sequence number consumes and, therefore, to enable more data to be cached for an object.

More importantly, in recent years, spoofing and impersonation software attacks have increased substantially. Such attacks may force a data provider to update its data in such a frequency that the associated sequence number rolls over. For instance, assuming that the cached sequence number is of version 5. Under a roll-over attack, the sequence number associated with the data provider may be updated so many times that it returns to version 5. As a result, the computing system erroneously assumes that the data supplied by the provider has not been changed, since the cached sequence number is the same as the sequence number that is currently associated with the data provider. Therefore, it is desirable to provide a mechanism to prevent such roll-over attacks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the invention address the above-identified problems by providing a system, a computer-implemented method, and a computer-readable medium for associating with each data provider a multi-level sequence number. Associating a multi-level sequence number with a data provider reduces the memory space that a sequence number can consume and effectively prevents possible roll-over attacks.

One aspect of the invention provides a system that includes at least one object and at least one data provider supplying data for the object. Each data provider is identified with a multi-level sequence number. The system further includes a cache maintaining a table for each object in the system. The table, named as per-object table, caches the multi-level sequence number ("cached sequence number") and the data ("cached data") for each data provider supplying data for the object. The system further includes a global table that associates each data provider with the current value of its multi-level sequence number ("current sequence number"). Once the data supplied by a data provider changes, the corresponding current sequence number in the global table is updated automatically.

In accordance with another aspect of the invention, when an object needs to obtain data supplied by a data provider, the cached sequence number of the data provider is compared with the current sequence number of the data provider. If the two numbers match, the cached data of the data provider is current. If the two numbers do not match, the cached data is outdated and the data provider is invoked to provide current data. The data provider updates the cached data with the current data and the cached sequence number with the current sequence number.

In accordance with a further aspect of the invention, the multi-level sequence number associated with a data provider is divided into multiple portions or levels. The sequence number includes a portion that is unique to the data provider ("provider-specific portion"). The sequence number further includes at least one portion that is shared by at least another sequence number identifying another data provider for the object ("common portion"). Consequently, the cached sequence number and the current sequence number match only if their corresponding provider-specific portions match and their corresponding common portions match.

In summary, aspects of the invention enable efficient use of memory space and prevent roll-over attacks by associating a multi-level sequence number to a data provider supplying data for an object. The invention also saves system computing time because cached data are invalidated and updated only when being requested.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
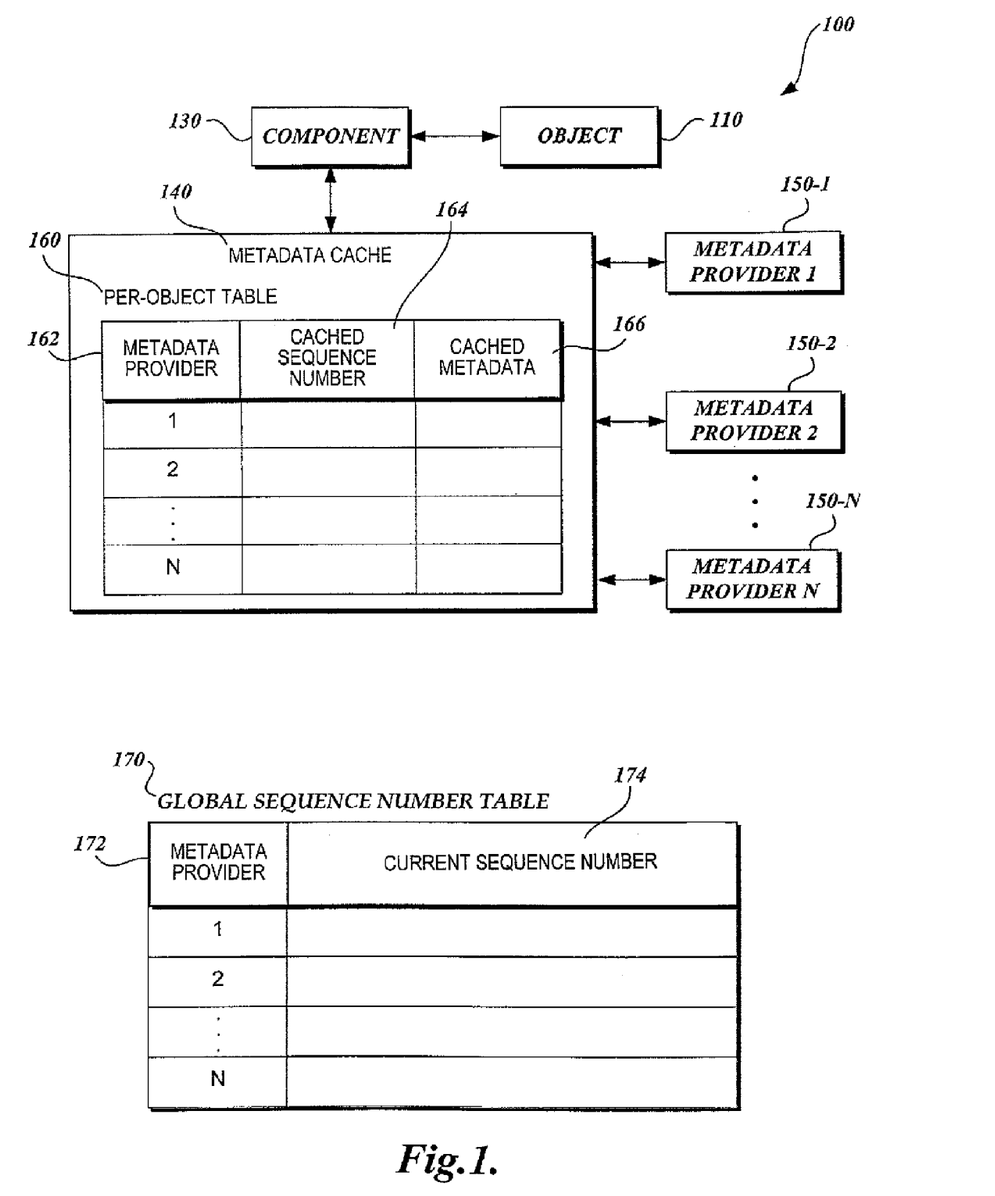
FIG. 1 is a block diagram illustrating a system for implementing aspects of the invention.

FIG. 1 is a block diagram illustrating an exemplary system 100 for implementing aspects of the invention in accordance with an embodiment of the invention. The system 100 includes at least one object 110, at least one component 130, and a metadata cache 140. The system 100 also includes multiple metadata providers 150-1 . . . 150-n supplying data for the object 110. Each of the metadata providers 150-1 . . . 150-n is associated with a multi-level sequence number whose value changes if the data supplied by the metadata provider changes.

The system 100 further includes a per-object table 160 that caches data supplied by the metadata providers 150-1 . . . 150-n for the object 110 and the corresponding sequence numbers. The system 100 further includes a global sequence number table 170 containing current values of the sequence numbers. Whenever a metadata provider updates its metadata, the value of the corresponding sequence number in the global sequence number table 170 is updated as well. A sequence number for a data provider from the per-object table may be compared with the data provider's current sequence number from the global sequence number table 170 to determine if the metadata cached in the per-object table 160 is current or the data provider needs to be invoked to provide current metadata for the object 110.

The component 130 may be any component in a computing system that tries to recognize the object 110 and to understand what data such as metadata are associated with the object 110. The object 110 may be associated with data supplied by different data providers such as the metadata providers 150-1 . . . 150-n.

In embodiments of the invention, the metadata cache 140 stores metadata associated with the object 110 in the per-object table 160. As shown in FIG. 1, the per-object table 160 includes a metadata provider column 162, a sequence number column 164, and a metadata column 166. The metadata provider column 162 lists the metadata providers 150-1 . . . 150-n (e.g., provider 1, provider 2, . . . , provider N.). The sequence number column 164 caches the sequence numbers ("cached sequence numbers") associated the metadata providers 150-1 . . . 150-n. The metadata column 166 caches metadata ("cached data") supplied by the metadata providers 150-1 . . . 150-n for the object 110.

In embodiments of the invention, data supplied by data providers such as the metadata providers 150-1 . . . 150-n may be updated from time to time. As a result, the sequence numbers associated with the data providers change as well. The system 100 may include multiple objects that are associated with data supplied by a data provider such as one of the metadata providers 150-1 . . . 150-n. Exemplary embodiments of the invention implement a lazy invalidation scheme by providing the global sequence number table 170 that associates each data provider with its current sequence number. As shown in FIG. 1, the global sequence number table 170 includes a metadata provider column 172 and a current sequence number column 174. The metadata provider column 172 lists the metadata providers 150-1 . . . 150-n (e.g., provider 1, provider 2, provider 3, etc.), while the current sequence number column 174 lists the current sequence numbers associated with each of the metadata providers 150-1 . . . 150-n.

In the exemplary embodiment of the invention, a cached sequence number from the cached sequence number column 164 is compared with the corresponding current sequence number from the current sequence number column 174 to determine if the metadata provider needs to be invoked to supply current metadata for the object 110. The sequence numbers thus may be considered as being comparable to time stamps, in that the cached sequence numbers are compared to the current sequence numbers.

In an exemplary embodiment of the invention, the system 100 may also include an ID engine (not shown), which generates an identifier for a specific object. For example, an identifier for a file may be the file path leading to the file. The ID engine generates an identifier for an object upon receiving a request from a component such as the component 130 to identify the object. The component then uses the identifier to search and retrieve data associated with the object.

As noted above in the background section, the system 100 may be attacked in such a way that one of the metadata providers 150-1 . . . 150-n updates its metadata so often that the associated sequence number rolls over. For example, the cached sequence number 164 for the metadata provider 150-1 may have the value 5. Under a roll-over attack or by an unintentional operational mistake such as a mistake in coding, the metadata provider 150-1 may be forced to update its metadata so many times that its current sequence number 174 rolls over and returns to the value 5. Thus, even though the metadata currently associated with the metadata provider 150-1 has changed because the values of the cached sequence number 164 and of the current sequence number 174 for the metadata provider 150-1 are equal, the component 130 erroneously concludes that the cached metadata 166 supplied by the metadata provider 150-1 is still current.

To address the roll-over attack described above, one approach is to increase the size of the sequence number, for example, from two bytes to eight bytes. However, such an increase may consume large amounts of memory space. For example, assume that the object 110 is associated with metadata supplied by 100 metadata providers 150-1 . . . 150-n. The memory space consumed by the cached sequence number 164 for the object 110 will increase from 200 bytes to 800 bytes if the size of a sequence number is increased from two bytes to eight bytes. Since the system 100 may include thousands of objects, each of which is associated with data supplied by different data providers, the sequence numbers will consume a huge amount of memory space.

Figure 2A:
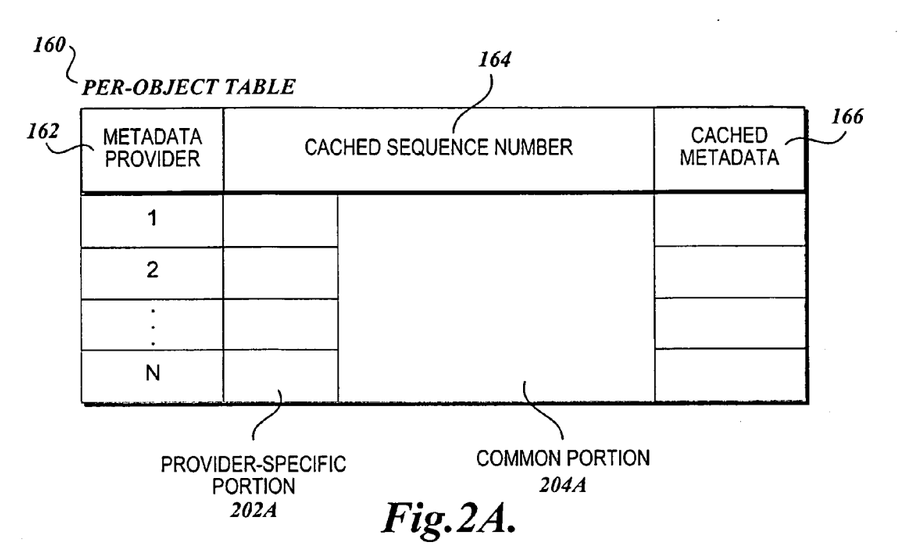
FIGS. 2A-2B are block diagrams illustrating one implementation of a sequence number, wherein the sequence number is divided into a provider-specific portion and a common portion.
Figure 2B:
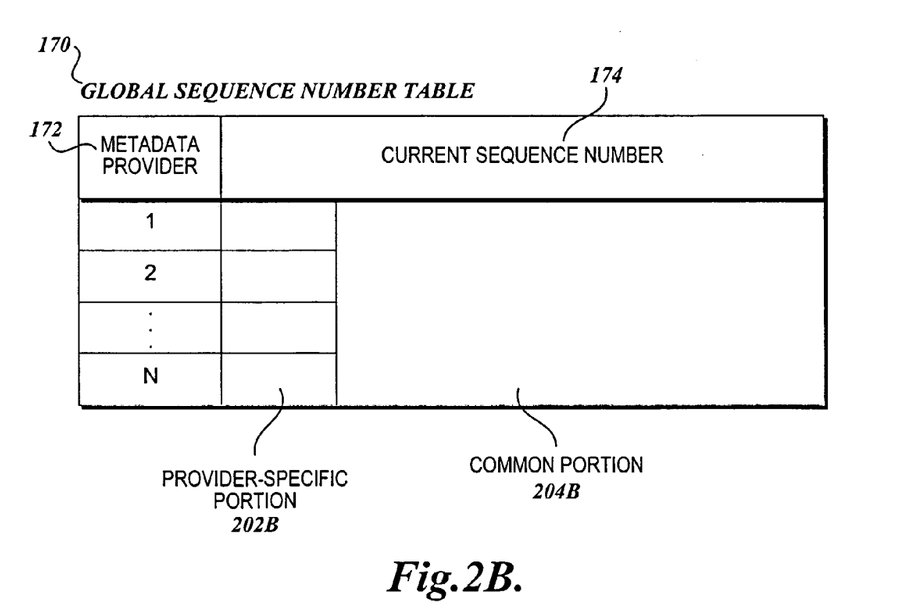

To address the roll-over attacks and to use memory space efficiently, embodiments of the invention provide multi-level sequence numbers. FIGS. 2A-2B illustrate one implementation of the multi-level sequence numbers. As illustrated in FIGS. 2A and 2B, in its simplest form, a multi-level sequence number includes two portions: a provider-specific portion and a common portion. As indicated by their names, the provider-specific portion has a value that is unique to each data provider while the common portion has a value that is shared by different data providers supplying data for the same object. In embodiments of the invention, the provider-specific portion has a much smaller size than the common portion. For example, if a sequence number has a size of four bytes, its provider-specific portion may take up one byte while its common portion takes up three bytes. Thus, the value of the provider-specific portion can grow as large as 255. When the provider-specific portion reaches the value 256, it automatically reduces itself to zero while the value of the common portion is incremented by one. Consequently, assuming the object 110 is associated with data supplied from a hundred metadata providers 150-1 . . . 150-n, only one hundred bytes may be used for the provider-specific portions of the sequence numbers and three bytes used for the common portion of the sequence numbers. As a result, the cached sequence numbers 164 only consume 103 bytes of memory space. This is a good reduction from the four hundred byte memory space that the cached sequence number 164 would have consumed, were each of the sequence numbers to take four bytes of memory space.

As shown in FIGS. 2A-2B, consequently, when comparing the cached sequence number 164 with the corresponding current sequence number 174, two comparisons are necessary. First, the provider-specific portion 202a of the cached sequence number 164 is compared with the provider-specific portion 202b of the corresponding current sequence number 174. If they match, then the common portion 204a of the cached sequence number 164 is compared with the common portion 204b of the current sequence number 174. If they match, the cached metadata 166 is current. Otherwise, the corresponding metadata provider is invoked to provide the current metadata.

Figure 3A:
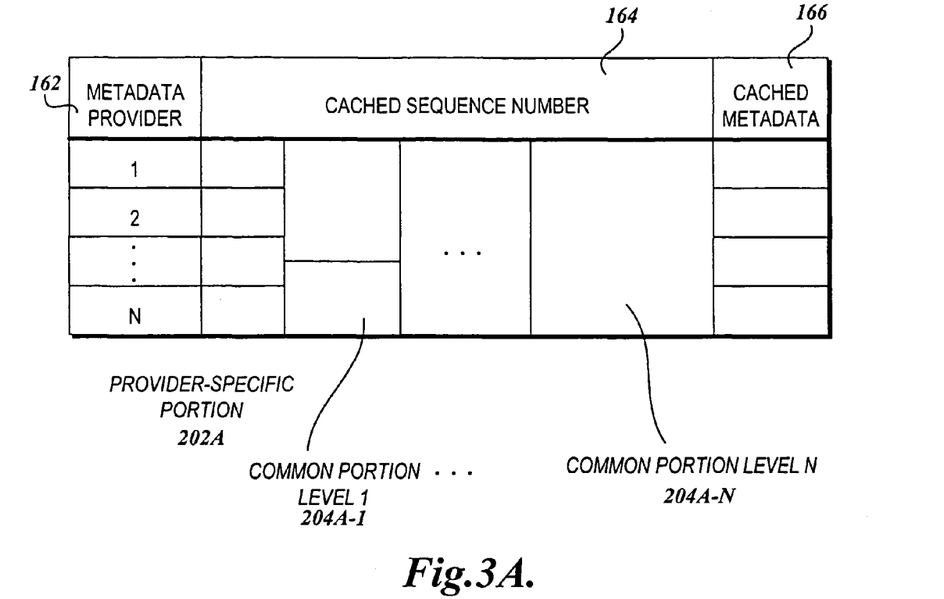
FIGS. 3A-3B are block diagrams illustrating another implementation of a sequence number, wherein the sequence number includes a provider-specific portion and a multi-level common portion.
Figure 3B:
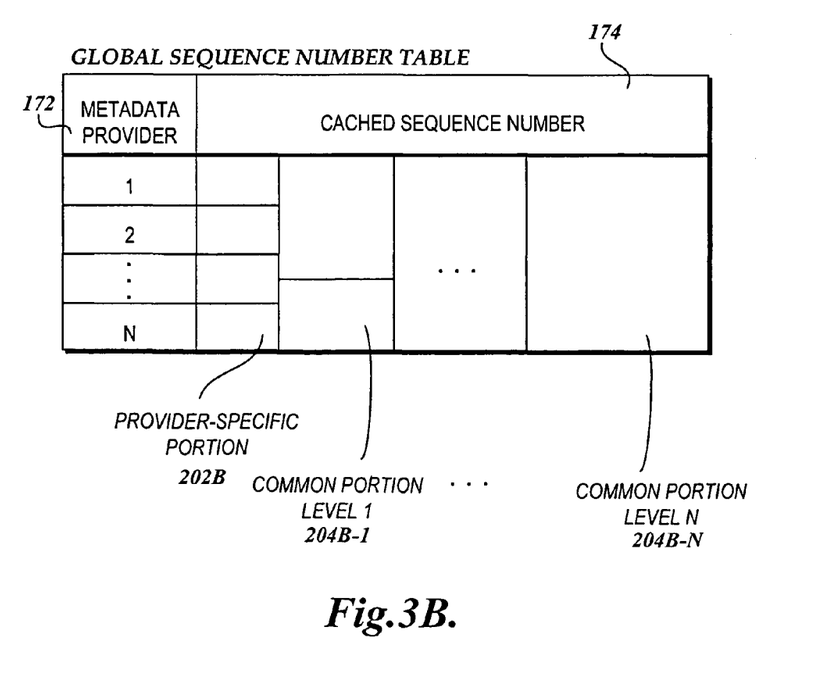

As illustrated in FIG. 3A-3B, some embodiments of the invention further divide the common portion of a sequence number into different levels. Continue to assume that the object 110 is associated with one hundred metadata providers 150-1 . . . 150-n. These metadata providers 150-1 . . . 150-n may be grouped into different categories. For instance, if providers 1-10 all provide administrative metadata, these ten metadata providers may share the same common portion level 1 (204A-1) value. If the providers 11-100 supply data of a shared nature, they may share a common portion level 1 (204A-1) of a different value. Embodiments of the invention allow as many divisions in the common portion of a sequence number as necessary. The last level, e.g., the common portion level N (204A-N) value can be shared by all the metadata providers associated with the object 110. Consequently, if the value of the common portion level 1 (204A-1) rolls over, the value of the common portion level 2 goes up one. Similarly, if the value of the common portion level 2 rolls over, the value of the common portion level 3 goes up one; and so on.

As a result, when comparing the cached sequence number 164 with the current sequence number 174, multiple comparisons are necessary. The provider-specific portion 202A is still first compared with the provider-specific portion 202B. If they match, each level in the common portion 204A is compared with the corresponding level of the common portion 204B. If they all match, the cached metadata 166 is current. Otherwise, the corresponding metadata provider is invoked to provide current metadata.

Figure 4:
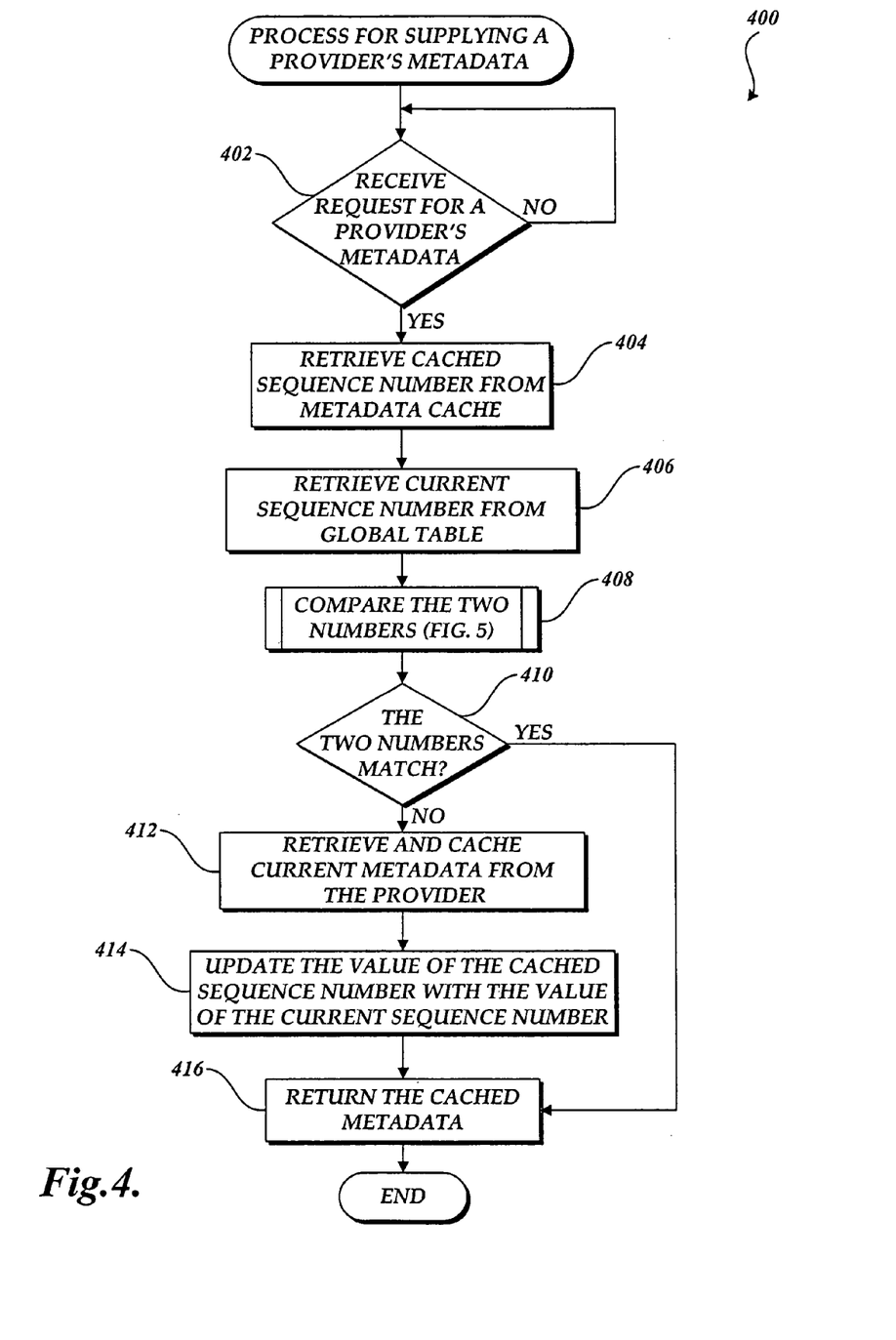
FIG. 4 is a flow diagram illustrating an exemplary process for supplying a metadata supplied by a metadata provider upon request.
Figure 5:
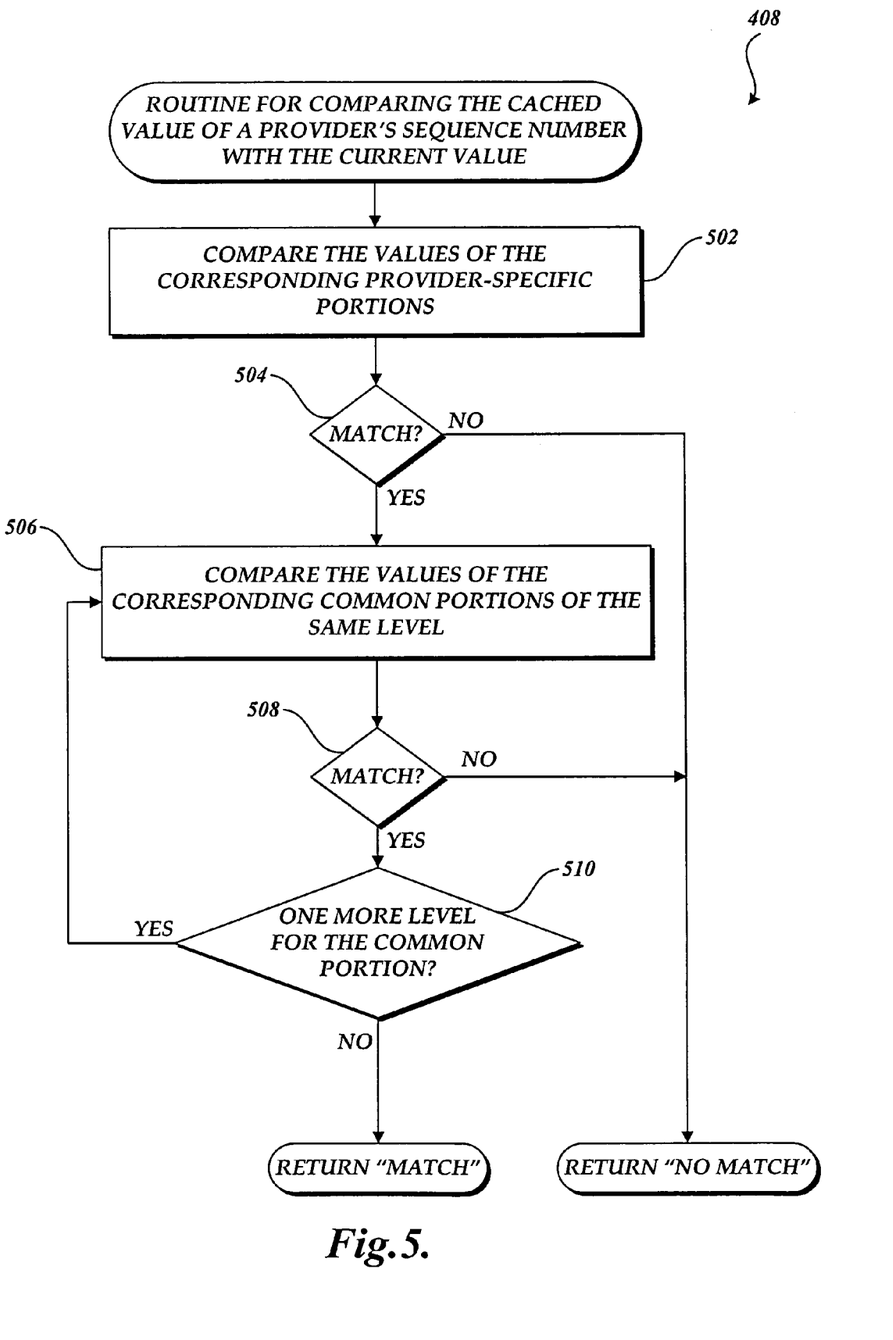
FIG. 5 is a flow diagram illustrating an exemplary routine for comparing the cached value and the current value of a provider's multi-level sequence number, suitable for use in FIG. 4.

FIG. 4 is a flow diagram illustrating an exemplary process 400 for supplying metadata from a metadata provider upon request. The process 400 uses the exemplary system 100 illustrated in FIG. 1 and the exemplary implementations of a sequence number illustrated in FIGS. 2A-3B. The process 400 initiates upon having received a request for metadata supplied by a specific metadata provider. See decision block 402. Once initiated by such a request, the process 400 retrieves the cached sequence number of the specific metadata provider from a metadata cache such as the metadata cache 140 illustrated in FIG. 1. See block 404. The process 400 then retrieves the corresponding current sequence number for the specific metadata provider from a global table such as the global sequence number table 170 illustrated in FIG. 1. See block 406. The process 400 then executes a routine 408 to compare these two numbers. See block 408. FIG. 5 illustrates an exemplary routine 408 and will be described in detail later.

After executing the routine 408, the process 400 proceeds to determine whether the two sequence numbers are equal. See decision block 410. If the answer is YES, the cached metadata for the specific metadata provider is deemed to be current. The process 400 returns the cached metadata to the requester and terminates. See block 416.

If the answer to decision block 410 is NO, meaning that the cached sequence number does not match the current sequence number, the process 400 retrieves current metadata from the specific metadata provider and caches the metadata in the metadata cache. See block 412. The process 400 then updates the value of the cached sequence number with the value of the current sequence number associated with the new metadata. See block 414. The process 400 then returns the cached metadata to the requester and terminates. See block 416.

As noted above, FIG. 5 is a flow diagram illustrating an exemplary implementation of the routine 408 used in the process 400. In essence, the routine 408 compares corresponding portions of the cached sequence number and the current sequence number, and returns a message indicating whether the two sequence numbers match. Specifically, the routine 408 first compares the values of the corresponding provider-specific portions of the two numbers. See block 502. The routine 408 then determines the result of the comparison. See decision block 504. If the answer to decision block 504 is NO, meaning that the values of the corresponding provider-specific portions of the two numbers do not match, the routine 408 returns a message indicating a mismatch. If the answer to decision block 504 is YES, the routine 408 proceeds to compare the values of the corresponding common portions of each level in the two numbers. The routine 408 enters a loop to compare the values of common portions of the same level in these two numbers. See block 506. If the comparison in block 506 does not result in a match, the routine 408 returns with a message indicating a mismatch. See decision block 508. If the answer to decision block 508 is YES, the routine 408 proceeds to determine whether there is another level in the common portion of the sequence number. See decision block 510. If the answer is YES, the routine 408 loops back to block 506 to compare the values of the common portions of the next level in the two sequence numbers. If the answer to decision block 510 is NO, indicating that all comparisons occurred in the routine 408 have resulted in a match, the routine 408 returns with a message indicating that the cached sequence number matches the current sequence number.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system, comprising:
    at least one object, the at least one object being associated with data;

a multi-level sequence number associated with the data for the at least one object, the multi-level sequence number comprising a first portion uniquely identifying a data provider, the data provider supplying the data associated with the at least one object, and a second portion common to a plurality of data providers;

a cache containing a cached value of the multi-level sequence number and a cached value of the data; and a global table comprising a current value of the multi-level sequence number, wherein:

when the data for the at least one object is requested, a comparison is performed of the cached value of the multi-level sequence number with the current value of the multi-level sequence number, the comparison comprising:

comparing the first portion of the cached value of the multi-level sequence number with the first portion of the current value of the multi-level sequence number; and when the first portion of the cached value of the multi-level sequence number matches the first portion of the current value of the multi-level sequence number, comparing the second portion of the cached value of the multi-level sequence number with the second portion of the current value of the multi-level sequence number; and when the data associated with the at least one object changes, the current value of the multi-level sequence number in the global table is updated, the updating comprising:

incrementing the value of the first portion of the current value of the multi-level sequence number in the global table; and when incrementing the value of the first portion of the current value of the multi-level sequence number causes the value of the first portion of the current value of the multi-level sequence number to reduce to an initial value, then incrementing the value of the second portion of the current value of the multi-level sequence number in the global table.

2. The system of claim 1, wherein: when, based on the comparison, the cached value of the multi-level sequence number does not match the current value of the multi-level sequence number, the data provider is invoked to provide current data.

3. The system of claim 1, wherein the cached value of the multi-level sequence number and the current value of the multi-level sequence number match when their corresponding first portions match and their corresponding second portions match.

4. The system of claim 1, wherein the data supplied by the data provider include metadata for the at least one object.

5. A computer-implemented method, comprising:

associating a multi-level sequence number with data, the data being associated with an object, the multi-level sequence number comprising a first portion uniquely identifying a data provider, the data provider supplying the data associated with the at least one object, and at least one second portion common to a plurality of data providers;

caching a cached value of the data and a cached value of the multi-level sequence number;

storing a current value of the multi-level sequence number in a global table; and upon receiving a request for the data, performing a comparison of the cached value of the multi-level sequence number with the current value of the multi-level sequence number, the comparison comprising:

comparing the first portion of the cached value of the multi-level sequence number with the first portion of the current value of the multi-level sequence number; and when the first portion of the cached value of the multi-level sequence number matches the first portion of the current value of the multi-level sequence number, comparing each portion of the at least one second portions of the cached value of the multi-level sequence number with the corresponding portion of the at least one second portions of the current value of the multi-level sequence number; and when the data associated with the object changes, updating the current value of the multi-level sequence number in the global table, the updating comprising:

incrementing a value of the first portion of the current value of the multi-level sequence number in the global table; and when incrementing the value of the first portion of the current value of the multi-level sequence number causes the value of the first portion of the current value of the multi-level sequence number to reduce to an initial value, then incrementing a value of at least one portion of the at least one second portions of the current value of the multi-level sequence number in the global table.

6. The computer-implemented method of claim 5, wherein: the method further comprises: supplying the cached value of the data if, based on the comparison, the cached value of the multi-level sequence number matches the current value of the multi-level sequence number; and requesting the data provider to supply current data if the cached value of the multi-level sequence number does not match the current value of the multi-level sequence number.

7. The computer-implemented method of claim 5, wherein the data supplied by the data provider include metadata for the object.

8. A computer-readable storage device including computer-executable instructions for a method for multi-level sequence number-based lazy invalidation, the method comprising:

associating a multi-level sequence number with data, the data being associated with an object, the multi-level sequence number comprising a first portion uniquely identifying a data provider, the data provider supplying the data associated with the at least one object and at least one second portion common to a plurality of data providers;

caching a cached value of the data and a cached value of the multi-level sequence number;

storing a current value of the multi-level sequence number in a global table; and upon receiving a request for the data, performing a comparison of the cached value of the multi-level sequence number with the current value of the multi-level sequence number, the comparison comprising:

comparing the first portion of the cached value of the multi-level sequence number with the first portion of the current value of the multi-level sequence number; and when the first portion of the cached value of the multi-level sequence number matches the first portion of the current value of the multi-level sequence number, comparing each portion of the at least one second portions of the cached value of the multi-level sequence number with the corresponding portion of the at least one second portions of the current value of the multi-level sequence number; and when the data associated with the object changes, updating the current value of the multi-level sequence number in the global table, the updating comprising:

incrementing a value of the first portion of the current value of the multi-level sequence number in the global table; and when incrementing the value of the first portion of the current value of the multi-level sequence number causes the value of the first portion of the current value of the multi-level sequence number to reduce to an initial value, then incrementing a value of at least one portion of the at least one second portions of the current value of the multi-level sequence number in the global table.

9. The computer-readable storage device of claim 8, wherein: the method further comprises: supplying the cached value of the data if, based on the comparison, the cached value of the multi-level sequence number matches the current value of the multi-level sequence number; and requesting the data provider to supply current data if the cached value of the multi-level sequence number does not match the current value of the multi-level sequence number.

10. The computer-readable storage device of claim 8, wherein the data supplied by the data provider include metadata for the object.

* * * * *